(12) United States Patent
Thomas et al.

(10) Patent No.: US 9,428,135 B1
(45) Date of Patent: Aug. 30, 2016

(54) TWO FRONT CENTER AIRBAG

(71) Applicants: GM GLOBAL TECHNOLOGY OPERATIONS LLC, Detroit, MI (US); TK Holdings Inc., Auburn Hills, MI (US)

(72) Inventors: Scott D. Thomas, Novi, MI (US); Richard Wiik, Oakland, MI (US)

(73) Assignees: GM Global Technology Operations LLC, Detroit, MI (US); TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/618,557

(22) Filed: Feb. 10, 2015

(51) Int. Cl.
*B60R 21/207* (2006.01)
*B60R 21/015* (2006.01)
*B60R 21/231* (2011.01)
*B60R 21/2338* (2011.01)
*B60R 21/26* (2011.01)

(52) U.S. Cl.
CPC ........ *B60R 21/207* (2013.01); *B60R 21/01512* (2014.10); *B60R 21/01558* (2014.10); *B60R 21/2338* (2013.01); *B60R 21/23138* (2013.01); *B60R 21/26* (2013.01); *B60R 2021/23107* (2013.01); *B60R 2021/23146* (2013.01)

(58) Field of Classification Search
CPC .......... B60R 21/207; B60R 21/01512; B60R 21/26; B60R 21/2338; B60R 21/23146; B60R 21/23138; B60R 2021/207; B60R 2021/03107
See application file for complete search history.

(56) References Cited

U.S. PATENT DOCUMENTS

| | | | | |
|---|---|---|---|---|
| 8,612,097 | B2 * | 12/2013 | Thomas | B60R 21/0136 701/45 |
| 2010/0264631 | A1 * | 10/2010 | Tomitaka | B60R 21/231 280/730.2 |
| 2012/0091697 | A1 * | 4/2012 | Wiik | B60R 21/23138 280/730.2 |
| 2012/0119473 | A1 * | 5/2012 | Lee | B60R 21/231 280/728.2 |
| 2013/0093224 | A1 * | 4/2013 | Dainese | B60R 21/207 297/216.12 |
| 2013/0197764 | A1 * | 8/2013 | Thomas | B60R 21/0136 701/45 |
| 2014/0042733 | A1 * | 2/2014 | Fukawatase | B60R 21/23138 280/730.2 |
| 2014/0151984 | A1 * | 6/2014 | Fukawatase | B60R 21/233 280/730.2 |
| 2015/0158453 | A1 * | 6/2015 | Fujiwara | B60R 21/207 280/730.2 |
| 2015/0197209 | A1 * | 7/2015 | Fujiwara | B60R 21/231 280/730.1 |

* cited by examiner

*Primary Examiner* — Darlene P Condra
(74) *Attorney, Agent, or Firm* — BrooksGroup (57) ABSTRACT

A number of variations may include a front center airbag system comprising: a first airbag mounted on an inboard side of a first front seat and a second airbag mounted on an inboard side of a second front seat, wherein the first airbag and the second airbag are constructed and arranged so that in a deployment condition the first airbag and the second airbag fill a space between and partially forward of the first front seat and the second front seat.

20 Claims, 4 Drawing Sheets

TWO FRONT CENTER AIRBAG

TECHNICAL FIELD

The field to which the disclosure generally relates to includes safety restraints.

BACKGROUND

A vehicle may include one or more safety restraints.

SUMMARY OF ILLUSTRATIVE VARIATIONS

A number of variations may include a front center airbag system comprising: a first airbag mounted on an inboard side of a first front seat and a second airbag mounted on an inboard side of a second front seat, wherein the first airbag and the second airbag are constructed and arranged so that in a deployment condition the first airbag and the second airbag fill a space between and partially forward of the first front seat and the second front seat.

A number of variations may include a front center airbag system comprising a first airbag mounted on an inboard side of a first front seat and a second airbag mounted on an inboard side of a second front seat, wherein the first airbag has a first gas pressure in a deployment condition and the second airbag has a second gas pressure in the deployment condition, and wherein the first gas pressure is different than the second gas pressure.

A number of variations may include a method comprising a front center airbag system for a vehicle comprising: providing a first airbag on an inboard side of a first front seat and a second airbag on an inboard side of a second front seat; and deploying the first airbag during an impact event at a first deployment time to provide at least one occupant with upper body region coverage and deploying the second airbag during the impact event at a second deployment time to provide the at least one occupant with mid body region coverage.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figures 10, 11, 12, 13:
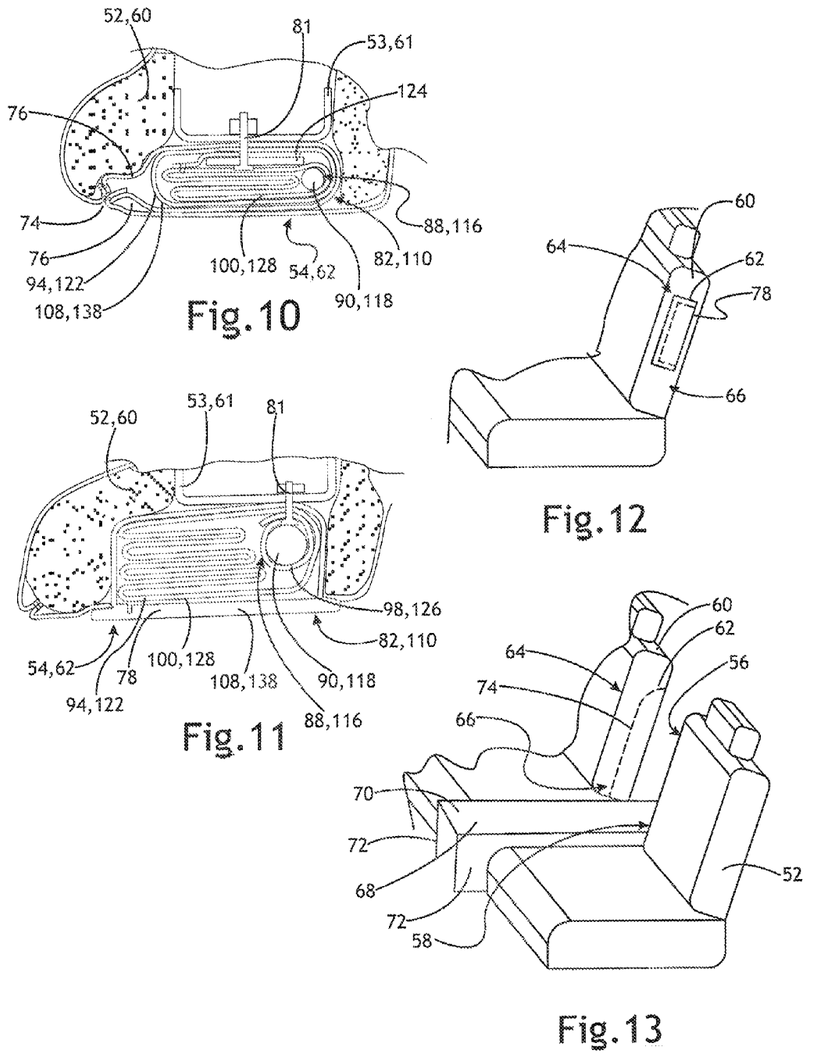
FIG. 10 illustrates a top section view of an airbag in a seat according to a number of variations.
FIG. 11 illustrates a top section view of an airbag in a seat according to a number of variations.
FIG. 12 illustrates a perspective view of a seat according to a number of variations.
FIG. 13 illustrates a perspective view of a driver and passenger seat according to a number of variations.

FIGS. 1-4, and 10-11 illustrate a number of variations including a front center airbag system 50. In a number of variations, a front center airbag system 50 may include a first airbag 82 which may be constructed and arranged to provide an occupant 2, 4, which may include a driver or a passenger, with upper body region coverage including, but not limited to, head and/or shoulder coverage during an impact event, and a second airbag 110 which may be constructed and arranged to provide an occupant 2, 4 with mid body region coverage including, but not limited to, torso coverage during an impact event. In another variation, the second airbag 110 may also be constructed and arranged to provide pelvis coverage. In a number of variations, the second airbag 110 may also be constructed and arranged to cover at least a portion of a center console 68, if a center console 68 is present in the vehicle. In a number of variations, the first airbag 82 and the second airbag 110 may be mounted on adjacent seats 52, 60. The use of two airbags 82, 110 may allow for the use of smaller diameter inflators 90, 118 and thinner cushion packs 94, 122, variations of which are illustrated in FIGS. 10 and 11, which may require less packaging space than may be required for a larger diameter inflator and a larger airbag cushion which may be used with a single front center airbag. This may allow deployed airbag cushion coverage for one or more front occupants 2, 4 of a vehicle using less packaging space which may allow for integration of a front center airbag system 50 into smaller vehicles and/or vehicles with narrow interiors where packaging space on the inboard side 54, 62 of the seat 52, 60 may be limited.

Figures 5, 6:
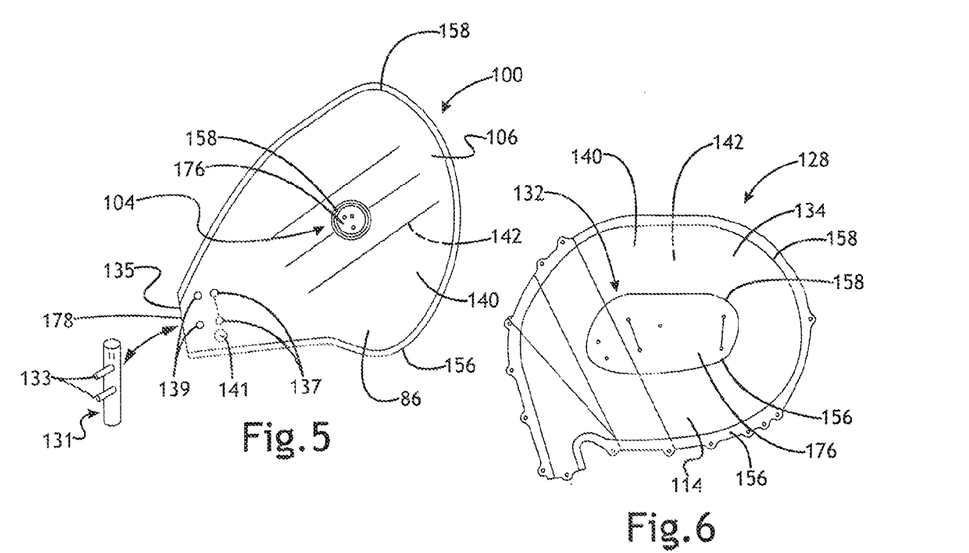
FIG. 5 illustrates a side view of an airbag cushion according to a number of variations.
FIG. 6 illustrates a side view of an airbag cushion according to a number of variations.
Figures 7, 8, 9:
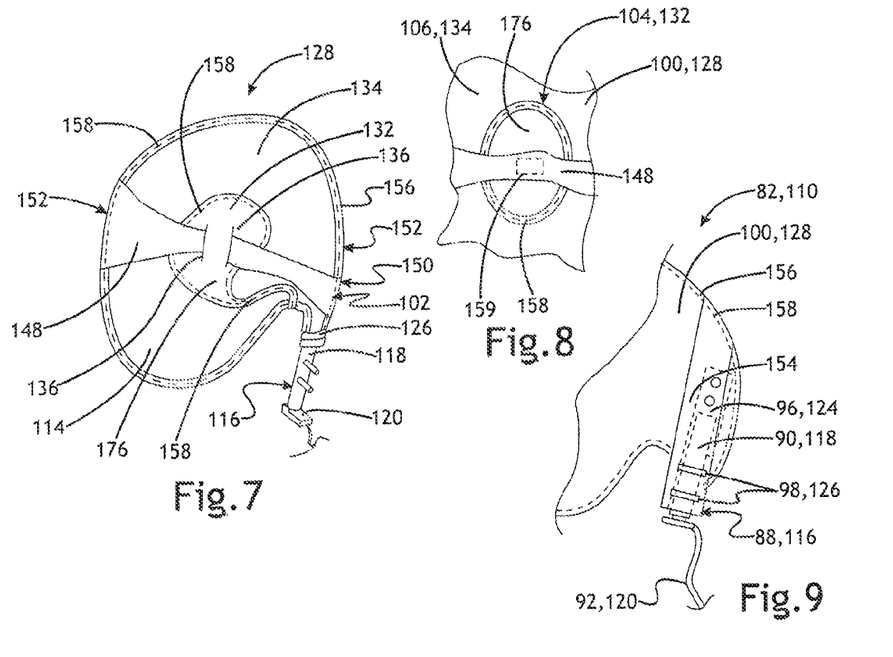
FIG. 7 illustrates a side view of an airbag cushion assembly according to a number of variations.
FIG. 8 illustrates a close-up view of an airbag according to a number of variations.
FIG. 9 illustrates a close-up view of a cushion assembly and inflator assembly according to a number of variations.

FIGS. 5-9 illustrate a number of variations. In one variation, the first airbag 82 may include a first cushion assembly 100 which may be constructed and arranged to provide an occupant 2, 4 with upper body region coverage including, but not limited to, head and/or shoulder coverage when inflated, a variation of which is illustrated in FIG. 5. The second airbag 110 may include a second cushion assembly 128 and may be constructed and arranged to provide an occupant 2, 4 with mid body region coverage including, but not limited to, torso coverage when inflated, variations of which are illustrated in FIGS. 6 and 7. In another variation, the second cushion assembly 128 may also be constructed and arranged to provide pelvis coverage. The first cushion assembly 100 and the second cushion assembly 128 may comprise a first panel 140 and a second panel 142. In one variation, the first and/or second panel 140, 142 may comprise a woven material and may include a coating on its outboard side 146 which may contact the opposing cushion assembly 100, 128 which may increase friction and may assist in coupling the first airbag cushion assembly 100 and the second airbag cushion assembly 128 together during a deployment condition which may reduce sliding of the first airbag 82 or the second airbag 110 over each other. Any number of coatings may be used including, but not limited to, a silicone coating. In another variation, an additional panel may be placed on the outside of the main panels 140,142 with coated side facing inboard toward the other module assembly to increase friction and may assist in coupling the first airbag cushion assembly 100 and a second airbag cushion assembly 128, which may reduce sliding of the first airbag 82 or the second airbag 110 over each other. In a number of variations one or more tethers, reinforcement panels, diffusers, and/or cushion attachments (not illustrated) may be attached to the first panel 140 and/or the second panel 142 which may increase the strength of the cushion assembly 100, 128 and may protect the cushion assembly 100, 128 from the inflator assembly 88, 116 (a variation of which is illustrated in FIG. 9). In another variation, the first panel 140 and the second panel 142 and any number of tethers and/or cushion related construction items may be integrally woven together as one piece or a large piece as part of the cushion assembly.

Referring to FIGS. 1, 3, and 5-8, in a number of variations, the first panel 140 and the second panel 142 may be attached together using at least one seam 158 which may extend at an offset around the perimeter of the first panel 140 and the second panel 142 so that a cushion selvedge 156 may remain around the perimeter of the seam 158. In a number of variations, the seam 158 may comprise one or more rows of stitching and/or may be woven so that the cushion assembly 100, 128 may be one piece. In a number of variations, the cushion assembly 100, 128 may also include one or more internal tethers (not illustrated) and/or external tethers which may be used to control the shape of the cushion assembly 100, 128 in an inflated condition 160. The one or more internal tethers may comprise one or more rows of stitching and/or may be woven into the cushion assembly 100, 128. In a number of variations, when the first airbag 82 and/or the second airbag 110 may be deployed, the first airbag cushion assembly 100 and/or the second airbag cushion assembly 128 may fill within the perimeter of the seam 158 and inflate. In a number of variations, the seam 158 may also include a sealant to retain gas in the first airbag cushion assembly 100 and/or the second airbag cushion assembly 128 at the seam 158. Any number of sealants may be used including, but not limited to, silicone. In another variation, the seam 158 may not be sealed.

Figure 1:
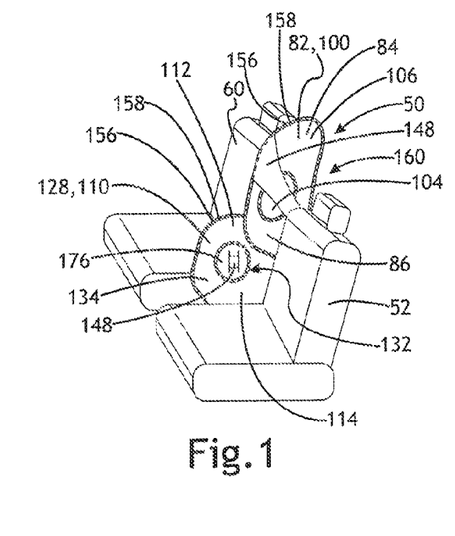
FIG. 1 illustrates a perspective view of an airbag system according to a number of variations.
Figure 3:
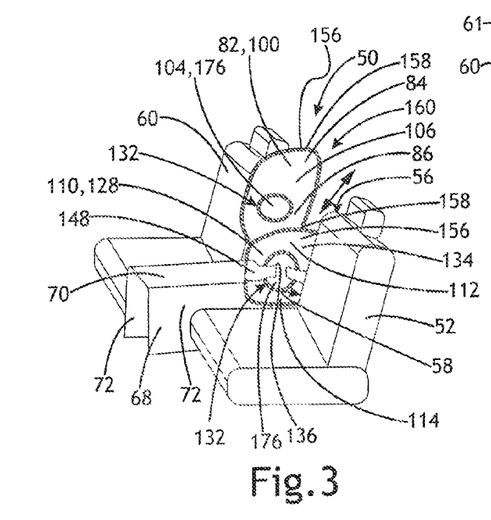
FIG. 3 illustrates a perspective view of an airbag system according to a number of variations.

In a number of variations, a middle region 104 of the first airbag cushion assembly 100 and/or a middle region 132 of the second airbag cushion assembly 128 may include an inactive region 176 within at least a portion of the middle region 104, 132. In a number of variations, the inactive region 176 may be closed off and/or sealed from the remaining outer portion 106, 134 of the cushion assembly 100, 128 so that during a deployment condition, the inactive region 176 may not inflate with a gas, whereas the outer portions 106, 134 may inflate with a gas, variations of which are illustrated in FIGS. 1, 3, and 5-7. The inactive region 176 may be any number of shapes including, but not limited to, circular, a variation of which is illustrated in FIG. 5, an oval-like shape, variations of which are illustrated in FIGS. 3 and 6, or a tear drop, hour glass, or banana shape (not illustrated). In a number of variations, there may be more than one inactive region 176. In a number of variations, when the first airbag 82 and/or the second airbag 110 may deploy, the inactive region 176 of the first airbag cushion assembly 100 and/or the inactive region 176 of the second airbag cushion assembly 128 may not inflate with the rest of the first airbag cushion assembly 100 and/or second airbag cushion assembly 128 so that the first airbag cushion assembly 100 and/or the second airbag cushion assembly 128 may comprise a torus-like shape when inflated, variations of which are illustrated in FIGS. 1 and 3. In another variation, the first airbag cushion assembly 100 and/or the second cushion assembly 128 may be sewn so that the inflated cushion portion does not completely surround the middle region 104, 132 so that the inflated cushion assembly 100, 128 may comprise a U-shape, an inverted U-shape, a C-shape, or an inverted C-shape, a variation of which is illustrated in FIG. 7. In a number of variations, a seam 158 may extend from the inactive region 176 to a portion of the perimeter seam 158 so that a bottom portion 86, 114 of the cushion assembly 100, 128 may be closed off and/or sealed at the rear end 102 of the cushion assembly 100, 128 so that the bottom portion 86, 114 may inflate last.

Referring to FIGS. 1, 3, and 7 and 8, in a number of variations, the first airbag cushion assembly 100 and/or the second airbag cushion assembly 128 may include one or more external tethers 148 which may be constructed and arranged to control the kinematics of the first airbag 82 and/or the second airbag 110 during deployment. In one variation, an external tether 148 may extend from the cushion selvedge 156 on a first end 150 of the cushion assembly 128 adjacent the inflator 118 and on the cushion selvedge 156 on a second opposite side 152 of the cushion assembly 128, a variation of which is illustrated in FIG. 7. In a number of variations, the external tether 148 may also be attached to an inactive region 176 of the cushion assembly 100, 128, variations of which are illustrated in FIGS. 1, 3, 7, and 8. The external tether 148 may be attached to the inactive region 176 in any number of variations including, but not limited to, routing the external tether 148 through one or more slots 136 which may be located in the inactive region 176 variations of which are illustrated in FIGS. 1, 3 and 7, and/or sewing 159 the external tether 148 to the inactive region 176, a variation of which is illustrated in FIG. 8. In one variation, the tether 148 may be used to pull the second cushion assembly 128 toward a front occupant 2, 4 so that the occupant 2, 4 may be quickly coupled to the second cushion assembly 128 after deployment of the second airbag 110. In other variations, one or more tethers may be arranged on either side of either cushion assembly 100, 128 in a manner where the one or more tethers are shorter in length than the inflated cushion to which the one or more tethers are attached so that they may pull either cushion 100, 128 toward either occupant 2, 4.

Referring to FIG. 9, in a number of variations, the first airbag cushion assembly 100 may be attached to a first mounting bracket 96 and a first inflator assembly 88 via one or more clamps 98. The second airbag cushion assembly 128 may be attached to a second mounting bracket 124 and a second inflator assembly 116 via one or more clamps 126. In a number of variations, the first airbag 82 and/or the second airbag 110 may include a sleeve 154 which may be constructed and arranged to accommodate an inflator assembly 88, 116, a mounting bracket 96, 124 and/or one or more clamps 98, 126. The first inflator assembly 88 may be inserted into sleeve 154 with a clamp 98 connecting the sleeve 154 to the first inflator assembly 88 to provide a gas seal. A second lower clamp 98 may attach the first mounting bracket 96 to a sleeve 154 of the first cushion assembly 100 and to the first inflator assembly 88 so that the first inflator assembly 88 may be in a position to fill the first cushion assembly 100 with gas to inflate the first cushion assembly 100. The second inflator assembly 116 may be inserted into the sleeve 154 with a clamp 98 connecting the sleeve 154 to the second inflator assembly 116 to provide a gas seal. A second lower clamp 98 may attach the second mounting bracket 124 to the sleeve 154 of the second cushion assembly 128 and to the second inflator assembly 116 so that the second inflator assembly 116 may be in a position to fill the second cushion assembly 128 with gas to inflate the second cushion assembly 128.

Another variation of attaching an inflator to a cushion is illustrated in FIG. 5. An inflator assembly 131 with two studs 133 extending from it may be inserted through the opening 135 in the first cushion assembly 100. The inflator assembly 131 may be oriented so that the bottom of the inflator assembly 131 below the studs 133 may protrude out a hole 141 on the first panel 140 and the studs 133 may protrude out holes 137 on the first panel 140. In this manner, the nozzle end of the inflator assembly 131 may remain within the first cushion assembly 100 between the first panel 140 and the second panel 142. The end 178 of the first cushion assembly 100 adjacent the opening 135 in the cushion assembly 100 may include one or more holes 139 which may extend through each of the first and second panels 140, 142 and may be constructed and arranged to be folded over and aligned with the holes 137 on the first panel 140 so that the studs 133 may pass through the holes 139. The studs 133 may then attach to the seat frame 53, 61. This variation may be used for either the first cushion assembly 100 or the second cushion assembly 128.

In yet another variation, the inflator 131 with studs 133 may be routed into the cushion assembly 100, 128 through a slot with at least one flap (not illustrated) as is known to a person skilled in the art. The flap may be oriented so that it may be compressed shut between the inflator and the seat frame 53, 61 when the studs are attached to the seat frame 53, 61. The flap may also be inside the cushion assembly 100, 128 and oriented in a manner so that when the cushion inflates, the inflator gas may push the flap against the inside of the cushion assembly 100, 128 and may seal the slot. Referring to FIGS. 10 and 11, in a number of variations, the first airbag cushion assembly 100 and the second airbag cushion assembly 128 may each be folded to a compact size. The fold of the first and second cushion assemblies 100, 128 may also assist in the trajectory of the first and second airbags 82, 110 when the first and second airbag 82, 110 may be deployed. Any number of folds may be used including, but not limited to, a roll fold, an accordion fold, or a combination of a roll fold and an accordion fold.

In a number of variations, a first cover 108 may surround at least a portion of the folded first airbag 82. A second cover 138 may surround at least a portion of the folded second airbag 110. The first and second covers 108, 138 may be any number of configurations including, but not limited to, a flexible wrap, a variation of which is illustrated in FIG. 10, or a rigid shell, a variation of which is illustrated in FIG. 11. In one variation, the rigid shell may comprise a portion of a discrete deployment door 78, as will be discussed hereafter. The cover 108, 138 may comprise one single continuous component or may include several components.

Figure 2:
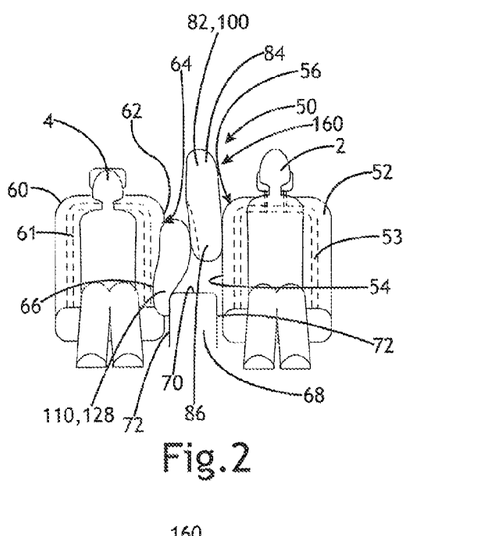
FIG. 2 illustrates a front view of an airbag system according to a number of variations.
Figure 4:
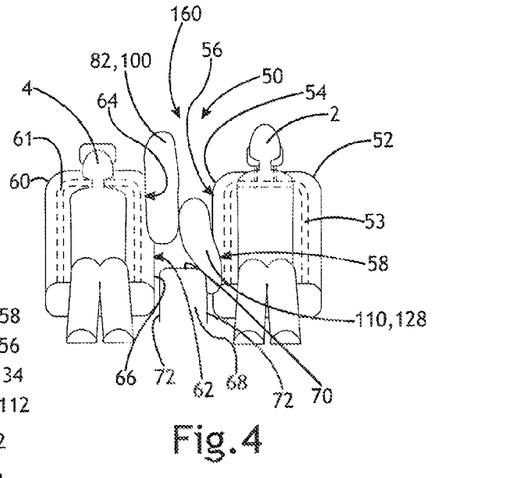
FIG. 4 illustrates a front view of an airbag system according to a number of variations.

Referring to FIGS. 1 and 2, in a number of variations, the first airbag 82 may be mounted on an upper portion 56 of the inboard side 54 of the driver seat frame 53 and the second airbag 110 may be mounted on a lower portion 66 of the inboard side 62 of the passenger side seat frame 61. Referring to FIGS. 3 and 4, in another variation, the first airbag 82 may be mounted on the upper portion 64 of the inboard side 62 of the passenger seat frame 61 and the second airbag 110 may be mounted on the lower portion 58 of the inboard side 54 of the driver seat frame 53. The first and second airbags 82, 110 may be attached to the seat frames 53, 61 in any number of variations including, but not limited, one or more mechanical fasteners 81, some variations of which are illustrated in FIGS. 10 and 11, and/or non-threaded variations including, but not limited to, a hook and window approach or a snap-in approach (not illustrated).

In a number of variations, both the first airbag 82 and the second airbag 110 may be concealed within the seat 52, 60. During deployment, the first and/or the second airbag 82, 110 may deploy through a tear seam 74 on the seat 52, 60, a variation of which is illustrated in FIGS. 10 and 13, and/or may deploy through a deployment chute 76 inside of the seat 52, 60, a variation of which is illustrated in FIG. 10. In another variation, the first airbag 82 and the second airbag 110 may deploy through a discrete deployment door 78, variations of which are illustrated in FIGS. 11 and 12. The discrete deployment door 78 may be integrated into the seat 52, 60 or may be part of the airbag 82, 110. In yet another variation, one of the first airbag 82 or the second airbag 110 may be concealed in the seat 52, 60 while the other may deploy through a discrete deployment door 78.

Referring to FIG. 9, in a number of variations, the first inflator assembly 88 may include a first inflator 90 and a first wire harness 92. The second inflator assembly 116 may include a second inflator 118 and a second wire harness 120. The first inflator 90 and the second inflator 118 may provide the same inflator output or may have different inflator outputs. The first and second wire harnesses 92, 120 may be operatively connected to an electronic control unit (ECU) (not illustrated) which may send signals to the first inflator 90 and the second inflator 118 to deploy if any number of vehicle conditions occur including, but not limited to, an impact event. One or more airbag sensors which detect a vehicle impact may be operatively connected to an electronic control unit (ECU) (not illustrated) which may include a sensing logic system which may be used to determine whether one or more impact events occur. If an impact event is detected which occurs above a predetermined deployment threshold in a particular direction, the ECU may then send a signal to at least one of the inflators 90, 118 to deploy the first and/or second airbag 82, 110. In one variation, the first airbag 82, the second airbag 110, or both the first and second airbags 82, 110 may not be deployed if one or more predetermined conditions occur including, but not limited to, the absence of a passenger, the direction of the impact to the vehicle, and/or the severity of the impact event is below a predetermined threshold.

In a number of variations, the first airbag 82 and the second airbag 110 may overlap each other in a deployment condition so that they may react against each other when inflated and loaded by an occupant 2, 4 which may increase the overall stiffness of the front center airbag system 50. In one variation, a lower portion 86 of the first airbag 82 may overlap an upper portion 112 of the second airbag 110 so that the overlap may be vertical in the vehicle. In one variation, the first airbag 82 may include a higher loft or thickness than the second airbag 110. In one variation, the first airbag 82 may include an upper portion 84 and a lower portion 86. At least a portion of the lower portion 86 may interact with a portion of the second airbag 110. The lower portion 86 may have a thickness which may be less than the thickness of the upper portion 84, a variation of which is illustrated in FIG. 2 with phantom lines. In a number of variations, the second airbag 110 may be constructed and arranged so that an upper portion 112 of the second airbag 110 may have an increased thickness than the lower portion 114 of the second airbag 110 which may provide head restraint to an occupant 2, 4 without the addition of the first airbag 82 mounted in the opposing seat 52, 60.

In a number of variations, when inflated, the first airbag 82 and the second airbag 110 may fill the area between the driver seat 52 and the passenger seat 60 and a portion of the first airbag 82 and the second airbag 110 may extend forward of the driver and passenger seats 52, 60. In a number of variations, the second airbag 110 may also extend over at least a portion of the center console 68 including, but not limited to, an upper portion 70 and/or a side portion 72 of the center console 68. In a number of variations, the first airbag 82 may have a first gas pressure in an inflated condition which may be lower than a second gas pressure of the second airbag 110 in an inflated condition. In another variation, the first airbag 82 may have a first gas pressure in an inflated condition which may be higher than a second gas pressure of the second airbag 110 in an inflated condition.

In a number of variations, the first airbag 82 and the second airbag 110 may be deployed at the same time. In another variation, the first airbag 82 and the second airbag 110 may be independently controlled so that the first airbag 82 and the second airbag 110 may be deployed at different times. In a number of variations, an impact event may occur above a deployment threshold in a direction where the front center airbag system 50 may be deployed. In one variation, the deployment time may be fixed so that the first airbag 82 may be deployed before the second airbag 110 or the second airbag 110 may be deployed before the first airbag 82. In another variation, the first airbag 82 may be deployed after a first delay while the second airbag 110 may deploy after a second delay. The first delay and the second delay may be calibratable within the sensing system logic in the ECU or may be changed based on any number of vehicle conditions including, but not limited to, a detected impact speed, impact type, and/or impact direction. In a number of variations, the first and second delay may be identical in time or one or both of the first delay or the second delay may be zero milliseconds.

Figure 14:
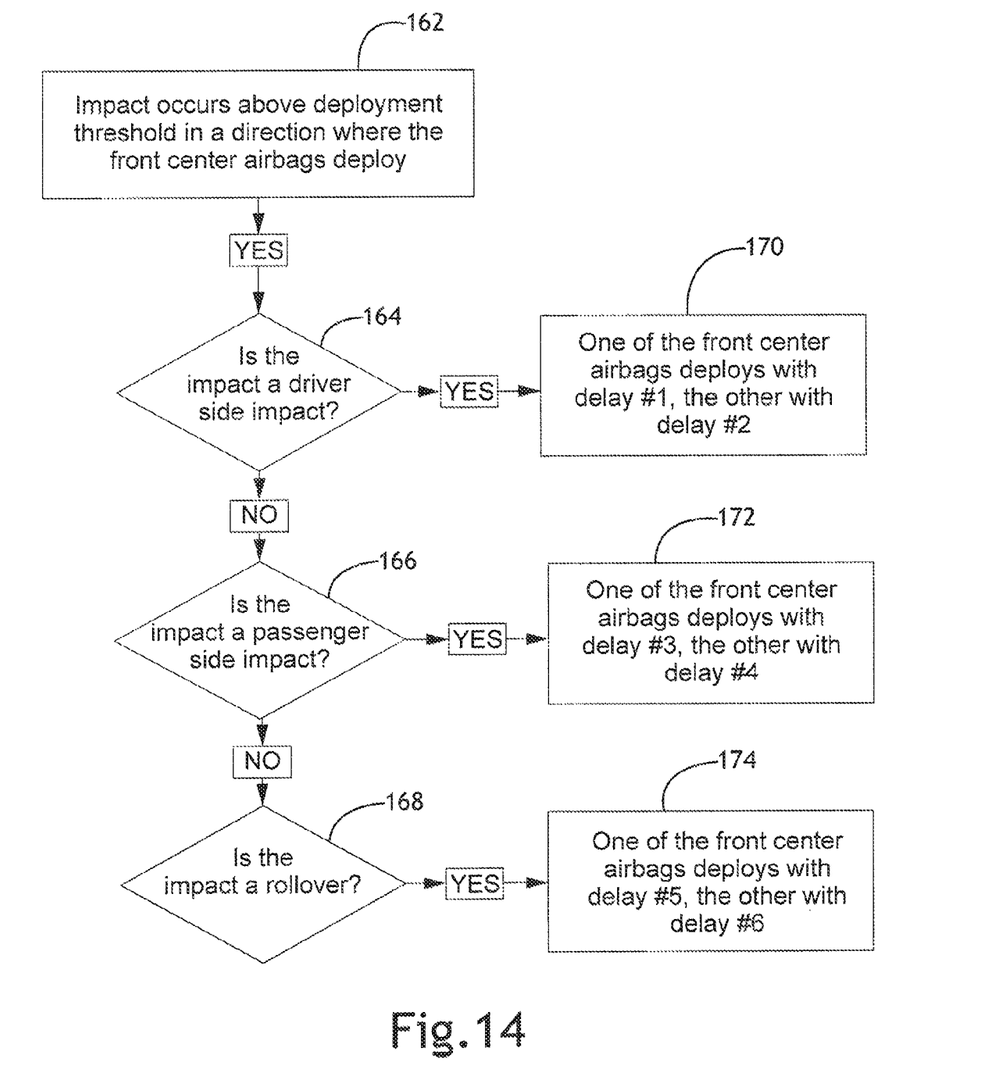
FIG. 14 illustrates a control chart according to a number of variations.

FIG. 14 illustrates a number of variations of a deployment logic which may be used to determine the deployment time of the first airbag 82 and/or the second airbag 110. A first condition 162 may occur which may be an impact event which may occur above a predetermined deployment threshold in a direction where the front center airbag system 50 may deploy. The deployment logic system may then determine whether a second condition 164, which may be a driver side impact event, has occurred. If yes, the first deployment logic 170 may cause the first airbag 82 to deploy with a first delay and the second airbag 110 to deploy with a second delay. The first delay may be longer in time than the second delay, the same as the second delay, or shorter in time than the second delay. If no, the deployment logic system may then determine whether a third condition 166 has occurred which may be a passenger side impact. If yes, a second deployment logic 172 may cause the first airbag 82 to deploy with a third delay and the second airbag 110 to deploy with a fourth delay. The third delay may be longer in time than the fourth delay, the same as the fourth delay, or shorter in time than the fourth delay. If no, the deployment logic system may determine whether a third condition 168 has occurred which may be a rollover impact. If yes, a third deployment logic 174 may cause the first airbag 82 to deploy with a fifth delay and the second airbag 110 to deploy with a sixth delay. The fifth delay may be longer in time than the sixth delay, the same as the sixth delay, or shorter in time than the sixth delay.

In another variation of the deployment logic, if the system detects that a passenger is not present and the impact is on the driver side, the system logic may be such that deployment of one or both of the front airbag system airbags may be disabled. A form of passenger detection system common in the industry may be used including, but not limited to, a weight based system, an electric field system, or an optical system.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a front center airbag system comprising: a first airbag mounted on an inboard side of a first front seat and a second airbag mounted on an inboard side of a second front seat, wherein the first airbag and the second airbag are constructed and arranged so that in a deployment condition the first airbag and the second airbag fill a space between and partially forward of the first front seat and the second front seat.

Variation 2 may include a front center airbag system as set forth in Variation 1 wherein the first airbag is constructed and arranged to provide an occupant with upper body region coverage during the deployment condition and wherein the second airbag is constructed and arranged to provide the occupant with mid body region coverage in the deployed condition.

Variation 3 may include a front center airbag system as set forth in any of Variations 1-2 wherein a portion of the first airbag and a portion of the second airbag overlap vertically in the deployed condition and react against each other.

Variation 4 may include a front center airbag system as set forth in any of Variations 1-3 wherein the second airbag overlaps a portion of a center console in the deployed condition.

Variation 5 may include a front center airbag system as set forth in any of Variations 1-4 wherein at least one of the first airbag or the second airbag has a cushion with an inactive middle region constructed and arranged so that a gas fills within at least one of the entire perimeter of the cushion or a portion of the perimeter during the deployed condition.

Variation 6 may include a front center airbag system as set forth in any of Variations 1-5 wherein at least one of the first airbag or the second airbag includes a tether.

Variation 7 may include a front center airbag system as set forth in any of Variations 1-5 wherein at least one of the first airbag or the second airbag includes a tether which is constructed and arranged upon deployment to pull the at least one airbag with the tether toward at least one occupant.

Variation 8 may include a front center airbag system as set forth in any of Variations 1-7 wherein the first airbag is attached to a first front seat frame and the second airbag is attached to a second front seat frame, and wherein at least one of the first airbag or the second airbag is constructed and arranged to deploy through at least one of a seat tear seam, a deployment chute, or a discrete deployment door.

Variation 9 may include a front center airbag system comprising a first airbag mounted on an inboard side of a first front seat and a second airbag mounted on an inboard side of a second front seat, wherein the first airbag has a first gas pressure in a deployment condition and the second airbag has a second gas pressure in the deployment condition, and wherein the first gas pressure is different from than the second gas pressure.

Variation 10 may include a front center airbag system as set forth in Variation 9 wherein the first airbag further comprises a first cushion assembly and wherein the second airbag further comprises a second cushion assembly, and wherein at least one of the first cushion assembly or the second cushion assembly is sealed to retain a deployment gas.

Variation 11 may include a front center airbag system as set forth in any of Variations 9-10 wherein the first airbag has a first thickness and the second airbag has a second thickness and wherein the first thickness is greater than the second thickness.

Variation 12 may include a front center airbag system as set forth in any of Variations 9-11 wherein the first airbag has an upper portion having a first thickness and a lower portion having a second thickness, and wherein the second thickness is less than the first thickness.

Variation 13 may include a front center airbag system as set forth in any of Variations 9-12 wherein upon deployment, a portion of the first airbag contacts a portion of the second airbag.

Variation 14 may include a method comprising a front center airbag system for a vehicle comprising: providing a first airbag on an inboard side of a first front seat and a second airbag on an inboard side of a second front seat; and deploying the first airbag during an impact event at a first deployment time to provide at least one occupant with upper body region coverage and deploying the second airbag during the impact event at a second deployment time to provide the at least one occupant with mid body region coverage.

Variation 15 may include a method as set forth in Variation 14 wherein the first deployment time and the second deployment time occur at the same time.

Variation 16 may include a method as set forth in Variation 14 wherein the first deployment time is different than the second deployment time.

Variation 17 may include a method as set forth in any of Variations 14-16 wherein the first deployment time and the second deployment time are fixed.

Variation 18 may include a method as set forth in any of Variations 14-16 wherein the first deployment time and the second deployment time are calibratable.

Variation 19 may include a method as set forth in any of Variations 14-18 wherein the first deployment time and the second deployment time are changed based upon at least one of a detected impact speed, an impact type, or an impact direction.

Variation 20 may include a method as set forth in any of Variations 14-19 wherein at least one of the first airbag or the second airbag is not deployed if at least one of a second occupant is not present in the first front seat or the second front seat, the impact event is on a driver side of the vehicle, or a severity of the impact event is below a predetermined threshold.

The above description of select variations within the scope of the invention is merely illustrative in nature and, thus, variations or variants thereof are not to be regarded as a departure from the spirit and scope of the invention.

What is claimed is:

1. A front center airbag system comprising:
a first airbag mounted on an inboard side of a first front seat and a second airbag mounted on an inboard side of a second front seat, wherein the first airbag and the second airbag are constructed and arranged so that in a deployment condition the first airbag and the second airbag fill a space between and partially forward of the first front seat and the second front seat such that when the first and second airbags are deployed, the first airbag occupies a space that is at least partially at a higher level than a space which the second airbag occupies.

2. The front center airbag system of claim 1 wherein the first airbag is constructed and arranged to provide an occupant with upper body region coverage during the deployment condition and wherein the second airbag is constructed and arranged to provide the occupant with mid body region coverage in the deployed condition.

3. The front center airbag system of claim 1 wherein the second airbag overlaps a portion of a center console in the deployed condition.

4. The front center airbag system of claim 1 wherein at least one of the first airbag or the second airbag has a cushion with an inactive middle region constructed and arranged so that a gas fills within at least one of the entire perimeter of the cushion or a portion of the perimeter during the deployed condition.

5. The front center airbag system of claim 1 wherein at least one of the first airbag or the second airbag includes a tether.

6. The front center airbag system of claim 1 wherein at least one of the first airbag or the second airbag includes a tether which is constructed and arranged upon deployment to pull the at least one airbag with the tether toward at least one occupant.

7. The front center airbag system of claim 1 wherein the first airbag is attached to a first front seat frame and the second airbag is attached to a second front seat frame, and wherein at least one of the first airbag or the second airbag is constructed and arranged to deploy through at least one of a seat tear seam, a deployment chute, or a discrete deployment door.

8. A front center airbag system comprising:
a first airbag mounted on an inboard side of a first front seat and a second airbag mounted on an inboard side of a second front seat, wherein the first airbag and the second airbag are constructed and arranged so that in a deployment condition the first airbag and the second airbag fill a space between and partially forward of the first front seat and the second front seat, wherein a portion of the first airbag and a portion of the second airbag overlap vertically in the deployed condition and react against each other.

9. A front center airbag system comprising a first airbag mounted on an inboard side of a first front seat and a second airbag mounted on an inboard side of a second front seat, wherein the first airbag has a first gas pressure in a deployment condition and the second airbag has a second gas pressure in the deployment condition, and wherein the first gas pressure is different from the second gas pressure.

10. The front center airbag system of claim 9 wherein the first airbag further comprises a first cushion assembly and wherein the second airbag further comprises a second cushion assembly, and wherein at least one of the first cushion assembly or the second cushion assembly is sealed to retain a deployment gas.

11. The front center airbag system of claim 9 wherein the first airbag has a first thickness and the second airbag has a second thickness and wherein the first thickness is greater than the second thickness.

12. The front center airbag system of claim 9 wherein the first airbag has an upper portion having a first thickness and a lower portion having a second thickness, and wherein the second thickness is less than the first thickness.

13. The front center airbag system of claim 9 wherein upon deployment, a portion of the first airbag contacts a portion of the second airbag.

14. A method comprising a front center airbag system for a vehicle comprising:
providing a first airbag on an inboard side of a first front seat and a second airbag on an inboard side of a second front seat wherein, when both airbags are deployed, the first airbag occupies a space that is at least partially at a higher level than a space which the second airbag occupies; and
deploying the first airbag during an impact event at a first deployment time to provide at least one occupant with upper body region coverage and deploying the second airbag during the impact event at a second deployment time to provide the at least one occupant with mid body region coverage.

15. The method of claim 14 wherein the first deployment time and the second deployment time occur at the same time.

16. The method of claim 14 wherein the first deployment time is different than the second deployment time.

17. The method of claim 14 wherein the first deployment time and the second deployment time are fixed.

18. The method of claim 14 wherein the first deployment time and the second deployment time are calibratable.

19. The method of claim 14 wherein the first deployment time and the second deployment time are changed based upon at least one of a detected impact speed, an impact type, or an impact direction.

20. The method of claim 14 wherein at least one of the first airbag or the second airbag is not deployed if at least one of a second occupant is not present in the first front seat or the second front seat, the impact event is on a driver side of the vehicle, or a severity of the impact event is below a predetermined threshold.

* * * * *